Patented Jan. 5, 1926.

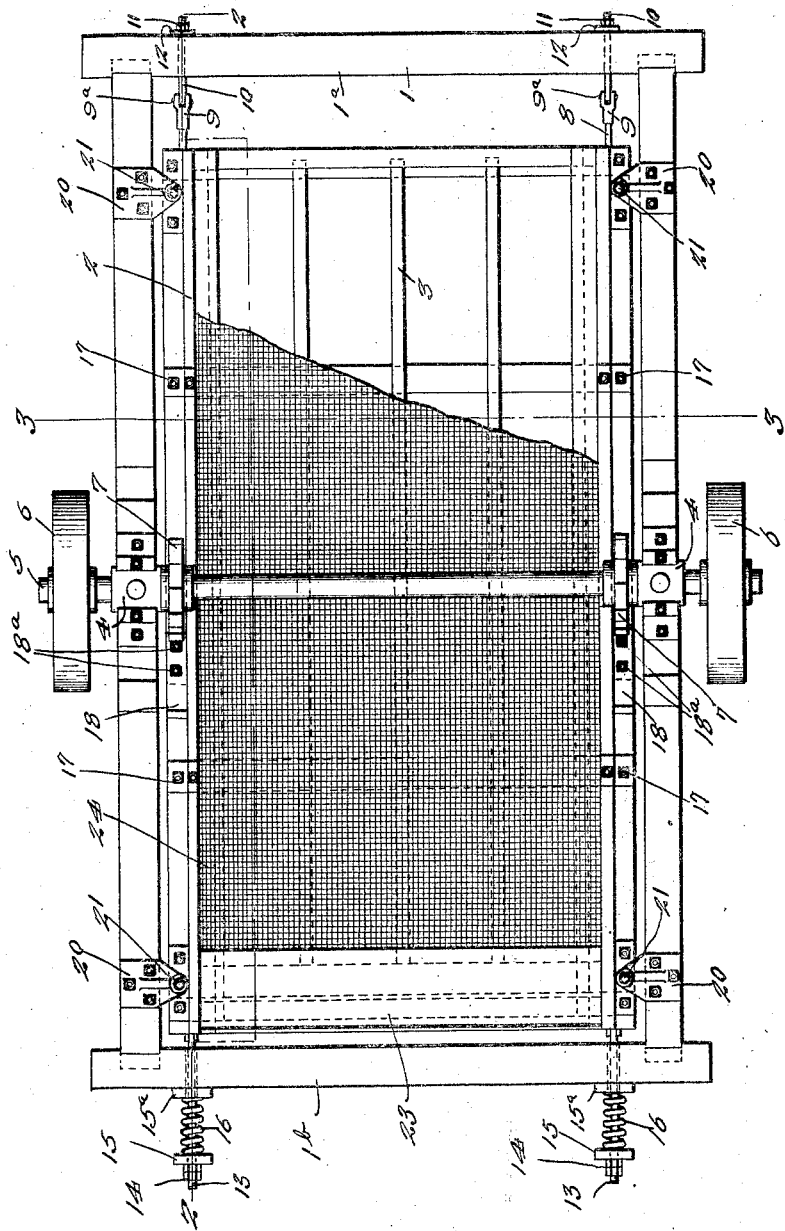

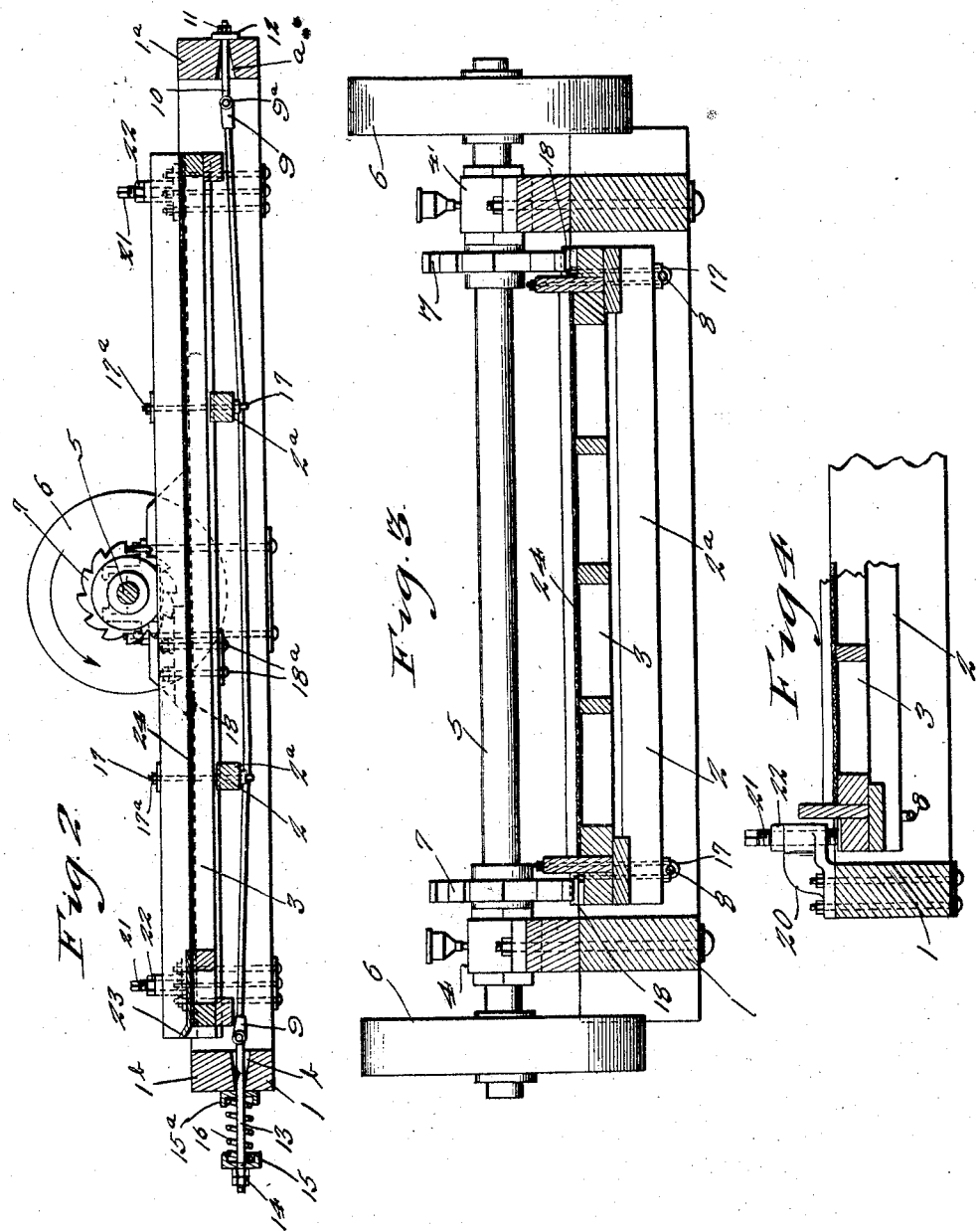

1,568,792

UNITED STATES PATENT OFFICE.

RANDALL P. AKINS, JOHN W. BUCHER, AND FREDERICK D. GROSS, OF DENVER, COLORADO.

SCREEN.

Application filed March 31, 1924. Serial No. 703,230.

*To all whom it may concern:*

Be it known that we, RANDALL P. AKINS, JOHN W. BUCHER, and FREDERICK D. GROSS, citizens of the United States, and residents of Denver, in the county of Denver and State of Colorado, have invented certain new and useful Improvements in Screens, of which the following is a specification.

Our present invention relates to an improved apparatus for screening ore and similar material, and aims to accomplish this by a simple, economical, durable and highly efficient form of screen in a manner in which all danger of relatively fine material being drawn into and lodged in the meshes of the screen will be reduced to a minimum, or avoided altogether.

With these and other objects in view, which will hereinafter appear, the invention includes the novel apparatus hereinafter described and particularly defined by the appended claims.

Our improved form of screens is illustrated in the accompanying drawings, in which:—

Figure 1 is a plan view of the screen.

Fig. 2 is a section on line 2—2 of Fig. 1.

Fig. 3 is a section on line 3—3 of Fig 1, and

Fig. 4 is a sectional detail.

In these drawings the screen is shown, for convenience of illustration as if located in a horizontal plane, but it will be understood that in actual use it is customarily supported in an inclined position, for example at an angle of 30° more or less to the horizontal so that the material being acted upon will travel over the surface of the screen, as the same is vibrated, by gravity.

Referring more particularly to the drawings, the numeral 1 designates a main carrying frame which may be rigidly supported in proper position by any suitable means not shown herein. Within this main frame and supported thereby in the manner hereinafter described, is a vibrating frame 2 which in turn carries a removable inner screen frame 3 to which is attached the screening medium 24 and the feed plate 23. The vibrating frame 2 is supported by flexible members 8, preferably in the shape of flexible or resilient steel cables or rods, which are attached to the frame, preferably at, or adjacent and beneath, the cross members $2^a$ (or in other words, spaced from the ends of the frame), these cross members serving to elevate the longitudinal bars of the frame above the flexible members, as shown in Fig. 2.

These flexible members may be secured to the frame in any suitable manner, as for example as shown in the drawings, by passing the flexible elements under the cross bars $2^a$ and holding them against the under side thereof in fixed relation by U bolts 17 passing upwardly through these bars and the overlying members and provided at their upper ends with nuts $17^a$.

Each end of each of the flexible members 8 has attached thereto a socket member 9. The socket members at one end of the screen are connected by hinge joints $9^a$ to bolts 10 which pass through flared openings $a$ in the end frame member $1^a$ and are secured by adjusting nuts 11 and washers 12 bearing against the outer face of said frame member. The socket members 9 at the opposite end of the screen are hinged in a similar manner to bolts 13 passing through flared openings $b$ in the end frame member $1^b$, these bolts being projected beyond the frame member and provided with opposed spring seat members 15 and $15^a$ between which are confined the compression springs 16 which are held under compression by the nuts 14. By proper adjustment of the nuts at one or both ends, the force of the spring and thereby the tension of the cables may be varied at will.

Bearings 4 are mounted on or carried by the side members of the main frame, in which bearings is journaled a shaft 5 adapted to be driven by one or both of the pulley fly wheels 6. This shaft carries fast thereon a pair of multiple toothed cam wheels 7 which engage with cam plates 18 attached by bolts $18^a$ to the side members of the vibrating frame 2.

Supposing the shaft 5 to be rotated in the direction of the arrow Fig. 2, the teeth of the cam wheels will necessarily engage the cam plates and force the vibrating screen downwardly against the resistance of the elastically tensioned flexible supporting members.

As the points of the corresponding teeth of the cam wheels pass the ends of the cam plates, the flexible supporting members 8 will force the screen frame upward with a very quick or swift motion. As said screen frame moves upward, its motion is suddenly arrested by means of adjustable stops preferably located at the four corners as indicated at 21, these stops being threaded and adjustably held in brackets 20 by means of lock nuts 22, and cooperating with or being impinged against by contacts 19 carried by frame 2 at the corners thereof.

We have found that a screen such as above described, is capable of being run with a very rapid vibration of relatively slight amplitude, with most excellent results.

As an example, an amplitude of one-sixteenth of an inch coupled with a speed of from six hundred to seven hundred impulses per minute, gives excellent results, and as in the embodiment shown, there are twelve teeth on each cam, this rapid vibration is accomplished by a shaft speed of from fifty to sixty revolutions per minute.

The rapid rotation of the cams causes the cam teeth to engage the cam plates so rapidly that this amounts to successive blows, each driving the screen frame downwardly faster than the material on the screen can follow it by gravity. When the cam teeth trip or pass from the cam plates, the screen is released and rapidly forced up by the supporting members, and its upward movement sharply arrested by the stops 20, whereupon the material on the screen is carried upward by its momentum and freed from the meshes of the screen.

To more particularly describe the action of the screen: the sudden arresting of the upward motion of the screen cloth tends to elevate or throw the particles of material being screened. The larger particles travel upward farther than the smaller particles, producing a sorting action which allows the smaller particles to come in contact with the screen surface and find an opening to pass through.

The rapid succession of suddenly arrested upward thrusts keeps the larger particles in the air most of the time so that they touch the screen cloth only at intervals, which tends to produce a floating action as the oversize or coarser particles rapidly travel down the inclined surface of the screen, giving the screen both high efficiency and great capacity.

Having thus described our invention, what we claim is:—

1. A vibrating screen comprising a stationary main frame, flexible members held in tension thereby, a movable frame attached to and supported by said flexible elements at points materially and equidistantly removed from the transverse center line of the movable frame, means acting against said movable frame at said center line for repeatedly rapidly depressing the movable frame against the supporting action of the flexible members, and suddenly releasing the downward pressure, and stops equidistantly spaced on each side of said center line to suddenly arrest the upward movement of the movable frame.

2. A vibrating screen comprising a stationary main frame, flexible members held in tension thereby, a movable frame attached to and supported by said flexible elements at points materially and equidistantly removed from the transverse center line of the movable frame, means acting against said movable frame at said center line for repeatedly rapidly depressing the movable frame against the supporting action of the flexible members, and suddenly releasing the downward pressure, and stops arranged at the four corners of the screen to suddenly arrest the upward movement of the movable frame.

In testimony whereof, we affix our signatures.

RANDALL P. AKINS.
JOHN WM. BUCHER.
FREDERICK D. GROSS.